United States Patent [19]

Mäser et al.

[11] Patent Number: 4,579,519
[45] Date of Patent: Apr. 1, 1986

[54] BLOW MOLD OPERATING AND LATCHING MECHANISM

[75] Inventors: Walter Mäser; Manfred Mank; Wolfgang Reymann, all of Hamburg; Klaus Vogel, Barsbüttel, all of Fed. Rep. of Germany

[73] Assignee: Krupp Corpoplast Maschinenbau GmbH, Fed. Rep. of Germany

[21] Appl. No.: 650,123

[22] Filed: Sep. 13, 1984

[30] Foreign Application Priority Data

Oct. 4, 1983 [DE] Fed. Rep. of Germany ....... 3336071

[51] Int. Cl.⁴ .............................................. B29C 33/28
[52] U.S. Cl. .................................. 425/541; 425/595; 425/451; 425/DIG. 221
[58] Field of Search ............... 425/522, 540, 541, 595, 425/451.9, DIG. 221, 450.1, 451

[56] References Cited

U.S. PATENT DOCUMENTS

| | | | |
|---|---|---|---|
| 806,633 | 12/1905 | Burnham | 425/451.9 |
| 841,644 | 1/1907 | Dennison | 425/451 |
| 1,032,626 | 7/1912 | Schulze | 425/541 |
| 2,903,740 | 9/1959 | Parfrey | 425/541 |
| 3,067,598 | 12/1962 | Schirm | 425/451.9 |
| 3,212,129 | 10/1965 | Craig et al. | 425/541 |
| 3,685,943 | 8/1972 | Fischer | 425/541 |
| 3,768,954 | 10/1973 | Marsh et al. | 425/451 |
| 3,825,356 | 7/1974 | Crook, Jr. | 403/122 |
| 3,825,396 | 7/1974 | Kontz | 425/451.9 |
| 4,082,492 | 4/1978 | Kurreck | 425/541 |
| 4,290,745 | 9/1981 | Kontz | 425/541 |
| 4,352,653 | 10/1982 | Ott et al. | 425/541 |

FOREIGN PATENT DOCUMENTS

| | | |
|---|---|---|
| 1966634 | 3/1978 | Fed. Rep. of Germany . |
| 2950723 | 12/1979 | Fed. Rep. of Germany . |
| 46-29993 | 8/1971 | Japan ..................... 425/541 |
| 396738 | 1/1966 | Switzerland ............. 425/451.9 |

Primary Examiner—Jay H. Woo
Assistant Examiner—J. Fortenberry
Attorney, Agent, or Firm—Harness, Dickey & Pierce

[57] ABSTRACT

The mold halves of a blow mold device are mounted on a pair of arms encircling the mold halves in a semicircular arc which arms are latched together by latching means which are located at the parting line of the mold halves at both sides thereof. Due to this structure, merely the portion of the arms extending between said latching means is subjected to bending forces by the blowing pressure. For swinging the arms and actuating the latching means a common slide is provided in parallel relationship to the longitudinal axis of the blow mold, which slide includes a number of control cams which are engaged by cam followers cooperating with said arms and said latching means. The invention provides a compact and light-weight construction allowing to actuate a smaller mass in shorter time, thus increasing the production capacity of the blow mold device.

15 Claims, 4 Drawing Figures

BLOW MOLD OPERATING AND LATCHING MECHANISM

BACKGROUND OF THE INVENTION

U.S. Pat. No. 3,825,396 concerns a blow mold device comprising mold halves mounted on arms which are pivotally arranged for a swinging motion about a vertical column. After closing the mold halves, the free ends of the arms or, respectively, the mold halves are mechanically latched together to prevent separating the mold by the blowing pressure. The arms are subjected to substantial bending forces in the portion between the latching assembly and the pivot axis. This results in large cross-sections of the apparatus and a large inert mass to be moved.

Similar aspects apply to another prior device according to German Application No. 19 66 634 providing for a number of mold halves which are mounted adjacent each other on beams which are mounted for rotation about an axis and which beams are latched together at their free ends by a locking assembly.

Still further, German Patent Specification No. 29 50 723 refers to a drive means for blow mold halves, according to which the carrier of the blow mold is moved longitudinally with respect to the blow mold to obtain thereby the opening and closing motion of the mold halves by cam means provided in a stationary plate. Again, to open and close the mold halves and the carrier, large inert masses have to be accelerated and decelerated.

According to a still further prior construction, substantial weight may be saved when the mold halves are latched together by a cone or a bell which is slipped over the mold. The latching force is thus exerted by a ring-shaped member which is subjected to tensional forces and which is of extremely light weight. However, this applies for mold halves of relatively small diameter as for larger molds the diameter of the bell becomes too large. Further, the bell has to perform a substantial stroke in closing so that the advantages of the light-weight construction and the fast actuation of the mold device are lost.

SUMMARY OF THE INVENTION

It is an object of the present invention to provide a blow mold apparatus of less weight which may be faster actuated to increase the production capacity of the machine.

According to the invention there is provided a blow mold device for making hollow articles from a plastic material in a blowing operation, comprising a pair of mold halves each one being secured to an arm which is pivotally driven in a horizontal direction about a vertical axis, and comprising a latching mechanism provided at the free end of said arms for latching together said arms in the closed position of the blow mold, wherein said arms each encircle said mold halves tong-like in an approximately semicircular arc and wherein a second latching mechanism is provided which is diametrically opposed to said first latching mechanism.

Thus the blowing pressure is taken up along the shortest possible way by said first and second latching assemblies which are provided at the mold half carrier arms semicircularly encircling the mold halves. The arms are subjected to bending forces merely in the portions extending between the oppositely located latching mechanisms. This construction results in a substantial saving of weight. The light structure allows for a fast actuation.

The subclaims concern further advantageous variants of the blow mold device according to the invention.

The construction of the present invention as outlined above further allows for an advantageous arrangement of the drive means for the swinging motion of the arms as well as for actuating the latching assemblies. A drive means according to the invention is provided by a slide including a number of control cams to actuate the mold half carrier arms and at least a latching mechanism when the slide is slidably driven in a path parallel to the vertical axis of the blow mold device. The drive mechanism may be used in any embodiment independent of merely providing a first latching mechanism or providing an additional second latching mechanism according to claims 1 to 8.

The slide comprises control cams for swinging the arms and actuating the latching mechanisms and further to move a bottom mold portion when desired. Thus all individual motions of the blow mold device are mechanically synchronized with respect to each other through the control cams of the slide. This allows for a close sequence of the individual motions and even for an overlapping of certain motions avoiding any danger of interference. Further, each individual motion may be controlled as a harmonic motion. The overall actuation may be optimized in time so that the motions are performed in shortest possible time as determined by the weight of the blow mold device.

Subclaims 10 to 17 concern advantageous variants of the drive means according to the invention.

BRIEF DESCRIPTION OF THE DRAWING

An embodiment of the invention is described below with reference to the accompanying drawing.

DETAILED DESCRIPTION OF THE PREFERRED EMBODIMENT

Figure 1:
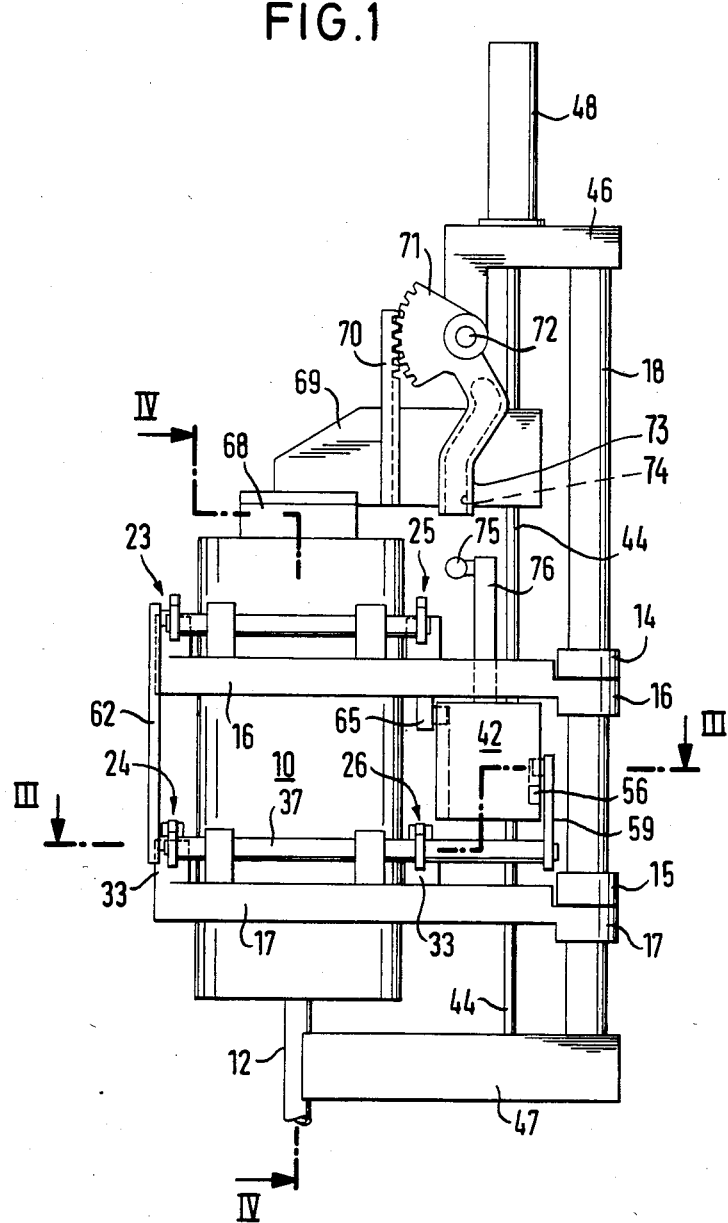
FIG. 1 is a side view of a blow mold device including a bottom mold portion.
Figure 2:
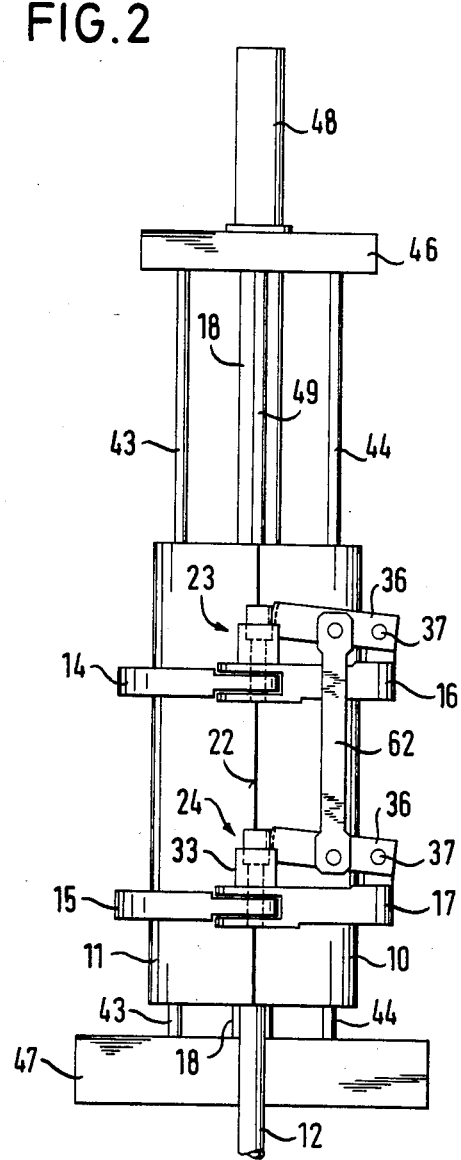
FIG. 2 is a front view of the blow mold device according to FIG. 1, wherein the bottom mold portion is eliminated.

FIGS. 1 and 2 of the drawing show a pair of blow mold halves 10 and 11 each comprising a mold cavity which is not shown, in which cavity a parison is placed, which parison is heated to blow mold temperature and carried on a blow mandrel 12. The parison is blown to its final shape after closing the blow mold. Each mold half 10 and 11 is mounted on a pair of arms 14,15 and 16,17 which are mounted at a distance one above the other and which arms are pivotally mounted about a vertical column 18.

Figure 3:
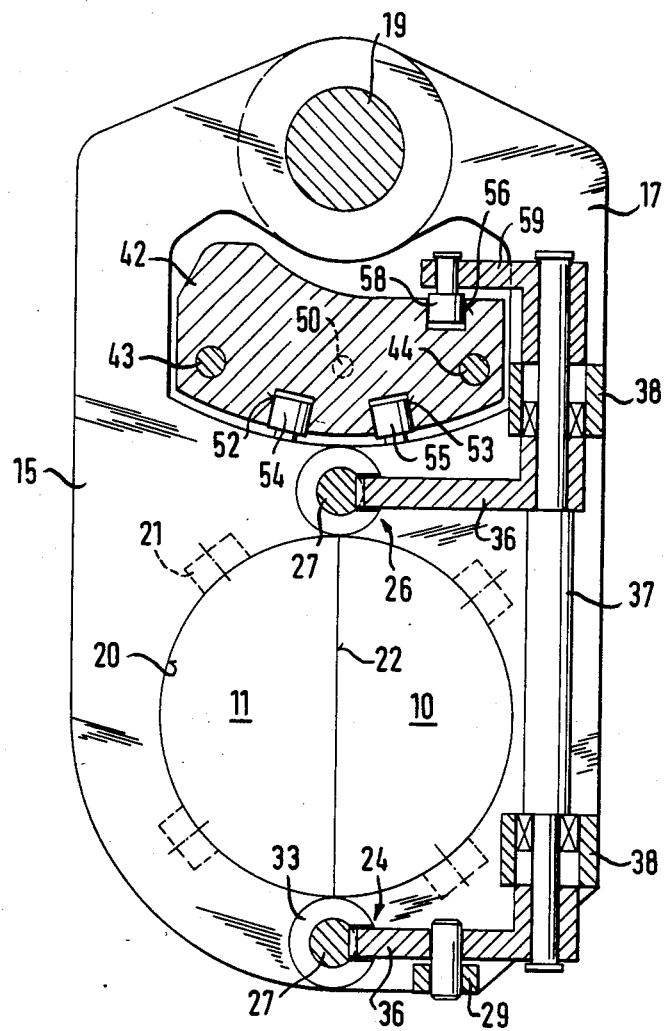
FIG. 3 is a sectional view in larger scale taken along line III—III in FIG. 1.

The shape of the arms is best seen in FIG. 3. Each arm is provided with an internal, semicircular recess 20 to support the semicylindrical outer surface of an adjacent mold half. Each arm is provided with a pair of lugs 21 indicated in FIG. 3 to mount the mold half thereto which lugs receive a bolt for mounting on the mold half.

Latching assemblies 23, 24, 25 and 26 are provided for latching together both mold halves in the closed position for opposing the very high blowing forces necessary to blow the parison to a hollow articles. For this pins 27 are provided closely adjacent the mold halves at the parting line 22 of both mold halves 10 and 11, which pins are inserted in co-aligned bores at each end of the arms 14–17 in the closed position of the mold halves.

Figure 4:
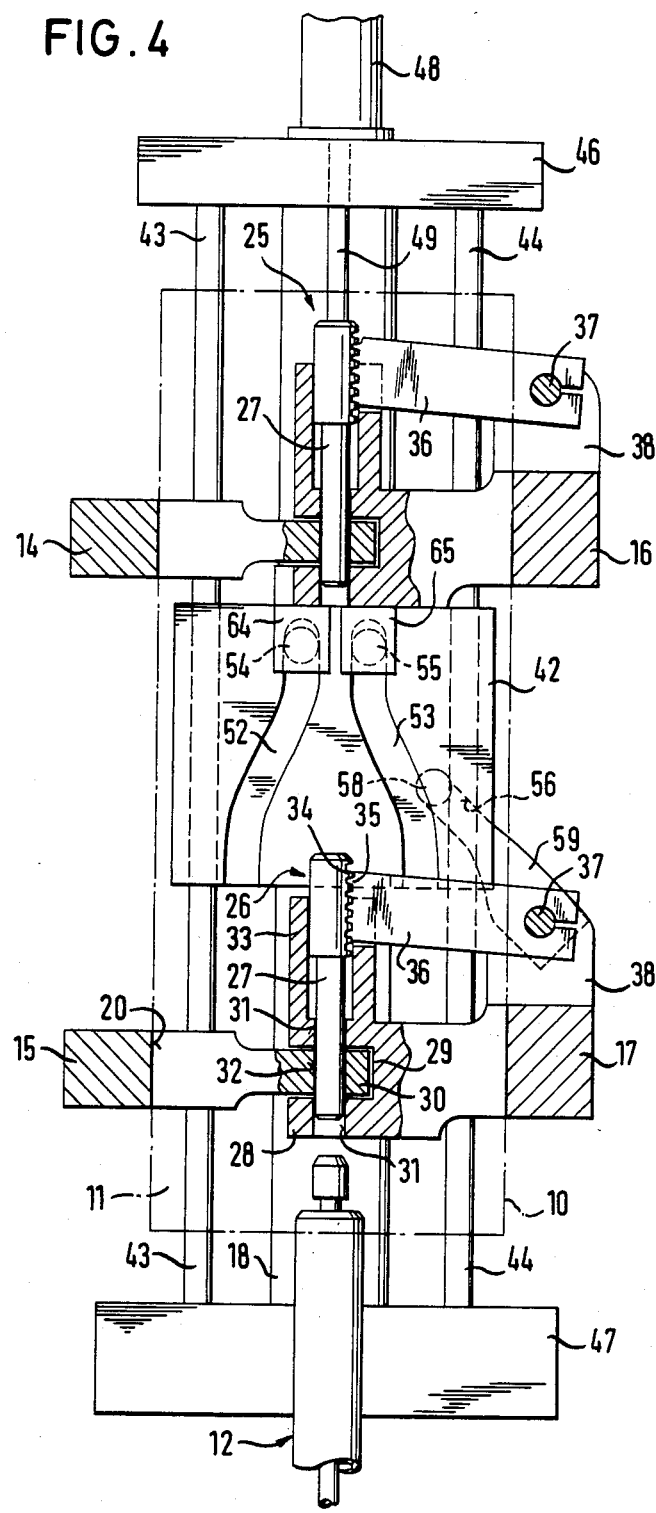
FIG. 4 is a vertical sectional view in larger scale taken along the line IV—IV in FIG. 1.

FIG. 4 shows in greater detail one of the latching mechanisms 23–26. According to FIG. 4 the end 28 of the arm 17 is U-shaped to provide a recess 29 receiving the end 30 of the arm 15 when the arms are swung around the column 18 to close the blow mold.

In this position the bores 31 and 32 provided in the ends 28 and 30 come into alignment with each other. The pin 27 to latch the arms is guided in an extension 33 of the arm 17 and includes a toothed portion 34 which is engaged by a toothed segment 35 provided on the end of a lever 36 which is secured to a shaft 37 rotatably supported in projections 38 of the arm 17. According to FIG. 4 the latching mechanism is shown in the latched position in which the pin 27 is in the down position. Upon rotation of the shaft 37 in clockwise direction, the lever 36 pivots and the pin 27 is moved by means of the toothed portions 34,35 in an upward position (not shown) in which the pin is released from the bore 32 of the arm 15 to release the latching assembly allowing the arms 15 and 17 to swing away from each other to open the blow mold.

It should be noted that all the latching assemblies 23–26 are of identical structure. Accordingly like components bear like reference numerals.

As may be easily seen from FIG. 3 the loading of the blow mold and the arms carrying the mold halves caused by the blowing pressure, i.e. the bending forces in the arms are supported in the shortest possible distance by the latching assemblies 23–26 located in opposed relationship with respect to the blow mold. What is really important is merely the bending strength of the arms in the portion between the latching assemblies since the arms in the portions between the column 18 and the adjacent latching assemblies are not subjected to the blowing pressure. The construction of the arms allows in particular for a light-weight design which is a condition for fast actuation. Furthermore, the column 18 is not subjected to blowing forces so that the column 18 serves as a guide for the rotation of the arms.

A drive means for reciprocating the arms to open and close the blow mold and for actuating the latching mechanisms is provided by a slide 42 which is slidable along a pair of stationary rods 43 and 44 parallel to the column 18. The guide rods 43 and 44 are mounted on a support 46 and 47 each connected to the upper and lower end of the column 18. The upper support 46 carries a servo cylinder 48 having a piston rod 49 that is connected to the slide as shown at 50 in FIG. 3. When the servo cylinder 48 is actuated, the slide 42 moves vertically upwardly or, respectively, downwardly.

FIGS. 3 and 4 further show that the slide 42 is provided with slots defining control cams 52 and 53 which are engaged by cam followers 54 and 55 which are rotatably mounted on the arm 15 and the arm 17, respectively. Pulling the slide 42 upwardly in referring to FIG. 2 showing the mold halves 10 and 11 in the closed position, the cam followers 54 and 55 move along the cams 52 and 53 so that the mold halves 10 and 11 are swung in the open position. Thereafter, a parison carried on a blow mandrel 12 may be placed through the gap between the front sides of the blow mold between the mold halves 10 and 11 into the blow mold cavity, whereupon the slide 42 is moved downwardly to pivot the arms about the column 18 until the mold halves 10 and 11 are closed.

A further cam 56 is provided in the slide 42 to actuate the latching assemblies. A cam follower cooperates with said cam 56 which follower is mounted on a lever 59 which is secured to the shaft 37. When the slide 42 is moved upwardly, the follower 58 travels along the cam 56, wherein the lever 59 is rotated clockwise thus rotating the shaft 37 to rotate the lever 36 and to release the pins 27, whereupon the arms are swung in the open position of the mold halves.

In moving the slide 42 downwardly to close the blow mold, the cam follower 58 again engages the control cam 56 to rotate the lever 59 counter-clockwise to return the pins in the latching position.

As the shaft 37 is capable of merely actuating the pins of the lower latching assemblies 24 and 26, the lower lever 36 is linked to the corresponding upper lever 36 through a coupling rod 62 which is located at the front side of the blow mold device as shown in FIG. 2.

The drive means for swinging the mold halves acts via the followers 54 and 55 on the upper arms 14 and 16 carrying the projections 64 and 65, the cam followers 54 and 55 rotatably secured thereto. The lower arms 15 and 17 need no drive means as they are connected to the upper arms 17 and 16 through the mold halves 10 and 11.

According to FIG. 1 an additional bottom mold portion 68 is provided atop the mold halves which bottom portion is mounted on a carriage 69 which is movable along the guide rods 43 and 44. The bottom mold 68 is moved upwardly after opening the mold halves and is moved downwardly before the mold halves close. For this a toothed rail 70 is secured to the carriage 69 which rail cooperates with a toothed segment 71 which rotates about an axis 72 of the upper support 46 and from which a lever 73 including a cam 74 depends, which cam cooperates with a cam follower 75 which is mounted on a rod 76 connected to the slide 42. When the slide 42 is lifted to open the mold halves, the cam follower 75 engages the oblique portion of the cam 74 to pivot the toothed segment 71 clockwise for lifting the carriage 69 and the bottom mold 68 by means of the toothed rail 70. Vice versa, the bottom mold 68 is first moved downwardly when the slide 42 is lowered, whereupon the mold halves become to be closed. The bottom mold and its actuation bearing the reference numerals 68–76 are shown only in FIG. 1, while these components are not shown in FIGS. 2–4 for better clarity.

By means of the common slide 42, all individual motions for actuating the mold halves, the latching assemblies and, when desired, the bottom mold are mechanically synchronized. Therefore, the individual motions may closely follow each other and may even overlap each other without resulting in any danger of interference. The construction of the arms and latching assemblies result in a substantial decrease of inert mass which makes it possible to conduct the motions in shortest possible time. Nevertheless, any individual motion can be controlled as a harmonic motion by means of the control cams.

In the embodiment shown the slide 42 is actuated by a pneumatic servo cylinder 48. However, the rod 49 actuating the slide 42 may be driven by a cam means as well. Furthermore, a plurality of blow mold devices may be arranged along the periphery of a rotating wheel. Then the supports 46 and 47 as well as the column 18 are stationary components of the rotating wheel.

We claim:

1. A blow mold device for making hollow articles made of a plastic material in a blowing operation, comprising a pair of mold halves having mating faces, two pairs of arms, each of said mold halves being secured to one of each pair, said arms being pivotal in a horizontal plane about a vertical axis, and comprising a first latching mechanism provided at the free end of said arms for latching said free ends together in the closed position of the blow mold, characterized in that said arms each encircle said mold halves in an approximately semicircular arc and that a second latching means is provided which is diametrically opposed to said first latching mechanism, said first and said second latching mechanisms lying substantially in the same plane as said mating faces when said blow mold is in its closed position.

2. The blow mold device of claim 1, wherein said second latching mechanism is provided between said blow mold and said vertical pivot axis.

3. The blow mold device of claim 1, wherein each pair of arms is pivotal about a common vertical column.

4. The blow mold device of claim 1, wherein the pairs of arms are vertically spaced one above the other.

5. The blow mold device of claim 1, wherein each latching mechanism comprises a reciprocating pin cooperative with a pair of co-aligned bores in said arms.

6. The blow mold device of claim 5, wherein said bores each are located at the ends of said mold-halves-encircling arms, said ends interengaging each other.

7. The blow mold device of claim 6, wherein a U-shaped end of a first arm interengages a projection of the adjacent end of a second arm.

8. A blow mold device for making hollow articles made of plastic material in a blowing operation, comprising a pair of mold halves each one being secured to an arm which is pivotally driven in a horizontal plane about a vertical axis, and comprising a latching mechanism provided at said arms for latching said arms together in the closed position of the blow mold, said latching mechanism comprising a first and second latching mechanism on diametrically opposite sides of said mold, characterized in that a slide including a number of control cams is provied to pivot said arms and operate said latching mechanism in response to the sliding movement of said slide in a path parallel to said vertical axis.

9. The blow mold device of claim 8, wherein the slide is provided between the blow mold and a vertical column defining said vertical axis.

10. The blow mold device of claim 8, wherein the slide is actuated by a servo cylinder.

11. The blow mold device of claim 8, wherein a plurality of blow molds are provided at the periphery of a rotating wheel, said slide being actuated by a control cam arranged at the periphery of the rotary wheel.

12. The blow mold device of claim 8, wherein the slide includes a pair of cams each cooperating with a respective cam follower secured to a respective arm.

13. The blow mold device of claim 8, wherein the latching mechanism comprises pins adapted to engage a pair of co-aligned bores of said arms, said pins including a toothed portion meshing with toothed segments each connected to levers secured to a common shaft, said shaft being rotatably supported on an arm rotatably actuated by a lever engaged by a cam of said slide.

14. The blow mold device of claim 13, wherein the levers for actuating said pins are located on arms, said arms being positioned one above the other and being linked together through a coupling rod for common actuation.

15. The blow mold device of claim 8 wherein a bottom mold is provided which is mounted on a carriage which is movably arranged in parallel relationship to said vertical axis, said carriage being actuated by said slide through a toothed segment and a control cam.

* * * * *